United States Patent [19]

Hiramatsu

[11] Patent Number: 5,802,121
[45] Date of Patent: Sep. 1, 1998

[54] SYNCHRONIZATION DEVICE FOR DIGITAL COMMUNICATIONS

[75] Inventor: Katsuhiko Hiramatsu, Yokohama, Japan

[73] Assignee: Matsushita Electric Industrial Co., Ltd., Osaka, Japan

[21] Appl. No.: 749,209

[22] Filed: Nov. 14, 1996

[30] Foreign Application Priority Data

Dec. 30, 1995 [JP] Japan ................................ 7-353782

[51] Int. Cl.⁶ .................................................. H04L 7/00
[52] U.S. Cl. ............................................ 375/368; 375/210
[58] Field of Search ................................ 375/200, 208, 375/210, 340, 344, 354, 362, 365, 367, 368; 370/324, 350, 503, 509, 510, 512; 364/728.03

[56] References Cited

U.S. PATENT DOCUMENTS 5,237,587  8/1993  Schoolcraft ............................. 375/208
5,276,706  1/1994  Critchlow ............................... 375/343
5,550,811  8/1996  Kaku et al. ............................. 370/342

FOREIGN PATENT DOCUMENTS 7250120  9/1995  Japan .

*Primary Examiner*—Don N. Vo
*Assistant Examiner*—Amanda T. Le
*Attorney, Agent, or Firm*—Pollock, Vande Sande & Priddy

[57] ABSTRACT

A synchronization device includes a first section for generating a predetermined signal. A second section is operative for detecting a correlation between a received signal and the predetermined signal generated by the first section for every sample interval. A third section is operative for selecting a correlation from among correlations detected by the second section for sample intervals of equal time positions in successive symbol intervals respectively. The correlation selected by the third section has a given order number regarding an order in which the correlations are arranged according to magnitude.

7 Claims, 6 Drawing Sheets

GIVEN SYMBOLS

SYNCHRONIZATION DEVICE FOR DIGITAL COMMUNICATIONS

BACKGROUND OF THE INVENTION

1. Field of the Invention

This invention relates to a synchronization device for a digital-communication radio receiver.

2. Description of the Prior Art

In typical digital communications by radio, information is transmitted symbol by symbol. For accurate recovery of transmitted information, it is important to acquire symbol synchronization between a transmitter and a receiver. Generally, a receiver has a device for automatically synchronizing a symbol timing signal (a symbol clock signal) with a received information signal.

In some digital-communication radio systems, a transmitter adds a given pattern signal to a head of a transmitted signal. The given pattern signal is used by a receiver to acquire symbol synchronization.

A typical synchronization device in a receiver has a correlator subjected to a pair of a reference pattern in-phase signal and a reference pattern quadrature signal, and also a pair of a received in-phase signal and a received quadrature signal. A pair of the reference pattern in-phase signal and the reference pattern quadrature signal corresponds to a given pattern signal generated in a transmitter. The correlator periodically calculates the value of in-phase correlation between a pair of the reference pattern in-phase signal and the reference pattern quadrature signal and a pair of the received in-phase signal and the received quadrature signal. Also, the correlator periodically calculates the value of quadrature correlation between a pair of the reference pattern in-phase signal and the reference pattern quadrature signal and a pair of the received in-phase signal and the received quadrature signal.

Furthermore, the correlator periodically calculates the power of the in-phase correlation value and the quadrature correlation value. The typical synchronization device has a section for comparing every calculated power with a threshold power. A phase of a symbol timing signal (a symbol clock signal) is controlled or determined in response to a moment at which the calculated power increases above the threshold power.

Japanese published unexamined patent application 7-250120 discloses a synchronization circuit including a correlator subjected to a unique-word signal and a received signal. The correlator periodically calculates the absolute value of correlation between the unique-word signal and the received signal. A buffer memory is loaded with a plurality of the calculated correlation values. In the synchronization circuit of Japanese application 7-250120, a peak detector selects the first greatest correlation value out of the calculated correlation values in the buffer memory. The peak detector also decides a time position corresponding to the first greatest correlation value. The synchronization circuit in Japanese application 7-250120 includes a judgment section which searches the buffer memory for the second greatest correlation value. If the second greatest correlation value exceeds a threshold value equal to the first greatest correlation value multiplied by a given proportion factor, and the time position corresponding to the second greatest correlation value precedes the time position of the first greatest correlation value, the time position of the second greatest correlation value is used as a synchronization timing. Otherwise, the time position of the first greatest correlation value is used as the synchronization timing.

SUMMARY OF THE INVENTION

It is an object of this invention to provide an improved synchronization device.

A first aspect of this invention provides a synchronization device comprising first means for generating a predetermined signal; second means for detecting a correlation between a received signal and the predetermined signal generated by the first means for every sample interval; and third means for selecting a correlation from among correlations detected by the second means for sample intervals of equal time positions in successive symbol intervals respectively, wherein the correlation selected by the third means has a given order number regarding an order in which the correlations are arranged according to magnitude.

A second aspect of this invention provides a synchronization device comprising first means for generating a predetermined signal; second means for detecting a correlation between a received signal and the predetermined signal generated by the first means for every sample interval; third means for selecting a correlation from among correlations detected by the second means for sample intervals of equal time positions in successive symbol intervals respectively, wherein the correlation selected by the third means has a given order number regarding an order in which the correlations are arranged according to magnitude; fourth means for generating a reference signal representing a predetermined threshold value; and fifth means for comparing the correlation selected by the third means with the threshold value represented by the reference signal.

A third aspect of this invention provides a synchronization device comprising first means for generating a predetermined signal; second means for detecting a correlation between a received signal and the predetermined signal generated by the first means for every sample interval; third means for selecting a correlation from among correlations detected by the second means for sample intervals of equal time positions in successive symbol intervals respectively, wherein the correlation selected by the third means has a given order number regarding an order in which the correlations are arranged according to magnitude; fourth means for generating a reference signal representing a predetermined threshold value; fifth means for comparing the correlation selected by the third means with the threshold value represented by the reference signal; sixth means for generating a time signal representing time which is updated for every sample interval; and seventh means for calibrating the time represented by the time signal in response to a result of the comparing by the fifth means.

A fourth aspect of this invention provides a synchronization device comprising first means for generating a predetermined signal; second means for detecting a correlation between a received signal and the predetermined signal generated by the first means for every sample interval; third means for selecting a correlation from among correlations detected by the second means for sample intervals of equal time positions in successive symbol intervals respectively, wherein the correlation selected by the third means has a given order number regarding an order in which the correlations are arranged according to magnitude; fourth means for generating a reference signal representing a predetermined threshold value; fifth means for comparing the correlation selected by the third means with the threshold value represented by the reference signal; and sixth means for inhibiting the third means from effectively operating in response to a result of the comparing by the fifth means.

A fifth aspect of this invention is based on the first aspect thereof, and provides a synchronization device wherein the third means comprises means for selecting a second greatest correlation from among correlations detected by the second means for sample intervals of equal time positions in a given number of successive symbol intervals.

A sixth aspect of this invention is based on the first aspect thereof, and provides a synchronization device wherein the third means comprises means for selecting a correlation from among correlations except a greatest correlation which is detected by the second means for sample intervals of equal time positions in a given number of successive symbol intervals.

A seventh aspect of this invention is based on the first aspect thereof, and provides a synchronization device wherein a number of the successive symbol intervals is predetermined.

DESCRIPTION OF THE PREFERRED EMBODIMENTS

First Embodiment

Figure 1:
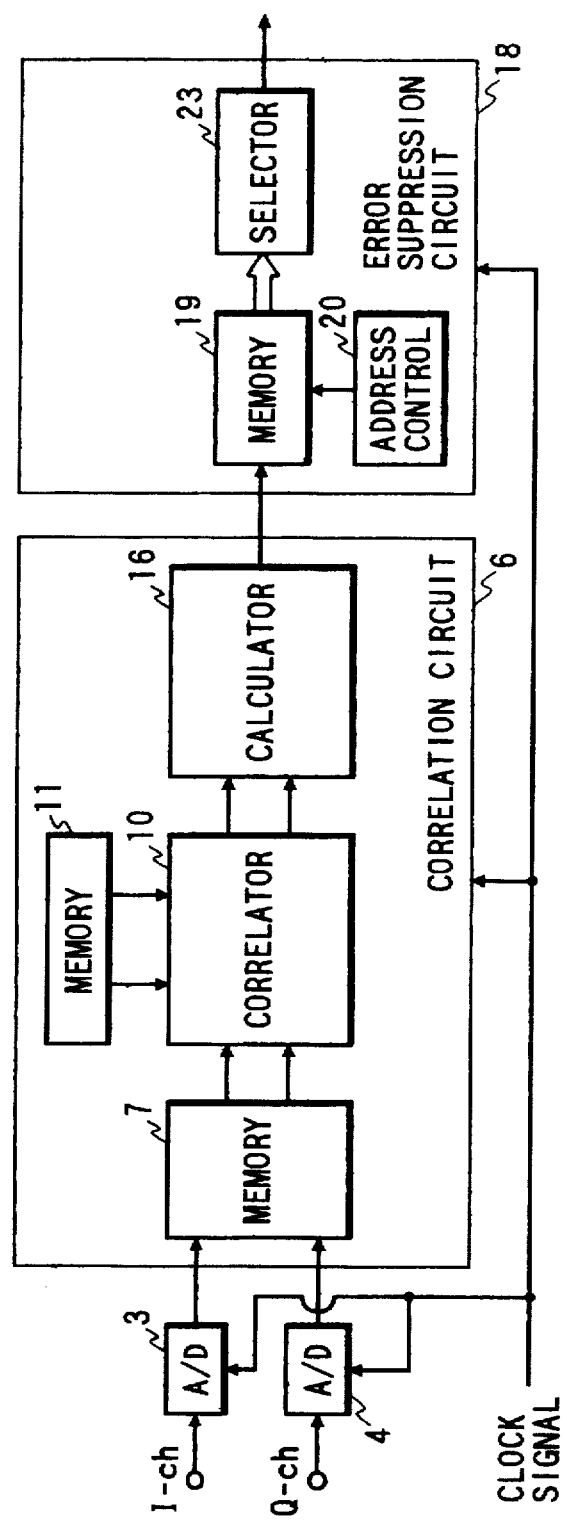
FIG. 1 is a block diagram of a synchronization device according to a first embodiment of this invention.

With reference to FIG. 1, a pair of a received in-phase signal (a received I-channel signal) and a received quadrature signal (a received Q-channel signal) are fed to analog-to-digital converters 3 and 4 respectively. Generally, the received in-phase signal and the received quadrature signal are derived from a received radio signal by a demodulator (not shown). The analog-to-digital converters 3 and 4 are referred to as the A/D converters 3 and 4. A basic clock pulse signal (a sample clock signal) having a predetermined high frequency is applied to the A/D converters 3 and 4. The received in-phase signal is periodically changed by the A/D converter 3 into a digital received in-phase signal at a timing determined by the basic clock pulse signal. The received quadrature signal is periodically changed by the A/D converter 4 into a digital received quadrature signal at a timing determined by the basic clock pulse signal.

A correlation circuit 6 follows the A/D converters 3 and 4. The correlation circuit 6 includes a memory 7, a correlator 10, a memory 11, and a calculator 16. The input side of the memory 7 follows the A/D converters 3 and 4. The output side of the memory 7 is connected to a first input side of the correlator 10. The memory 11 is connected to a second input side of the correlator 10. The output side of the correlator 10 is connected to the input side of the calculator 16.

The memory 7, the correlator 10, the memory 11, and the calculator 16 in the correlation circuit 6 receive the basic clock pulse signal. The memory 7, the correlator 10, the memory 11, and the calculator 16 operate in response to the basic clock pulse signal so that timings of operation thereof are controlled by the basic clock pulse signal.

A pair of the digital received in-phase signal and the digital received quadrature signal are written into the memory 7 from the A/D converters 3 and 4 sample by sample. Here, "sample" corresponds in time interval to "symbol" divided by a given natural number, for example, 2, 4, 8, or 10. For each of the digital received in-phase signal and the digital received quadrature signal, the memory 7 has a capacity corresponding to a given number "L" of samples. Accordingly, "L" successive samples of each of the digital received in-phase signal and the digital received quadrature signal are stored in the memory 7. The given number "L" of samples corresponds to one symbol. Each time a pair of new samples of the digital received in-phase signal and the digital received quadrature signal is written into the memory 7, a pair of the oldest samples thereof is erased from the memory 7. The memory 7 serves as a shift register.

The memory 11 stores a pair of a reference in-phase signal and a reference quadrature signal corresponding to one symbol. A pair of the reference in-phase signal and the reference quadrature signal in the memory 11 represents a given symbol (a symbol in a given state) for the acquisition of symbol synchronization. Each of the reference in-phase signal and the reference quadrature signal in the memory 11 is divided into "L" 1-sample corresponding segments.

The correlator 10 implements a sequence of the following processes for every sample interval. The correlator 10 reads out "L" samples of each of the digital received in-phase signal and the digital received quadrature signal from the memory 7. The correlator 10 reads out "L" 1-sample corresponding segments of each of the reference in-phase signal and the reference quadrature signal from the memory 11. The correlator 10 calculates the value "$comb_I$" of in-phase correlation between a pair of the received in-phase signal and the received quadrature signal and a pair of the reference in-phase signal and the reference quadrature signal according to an equation as follows.

$$comb_I = Re\left[ \sum_{i=1}^{L} sw(i) \times r(i)^* \right] \quad (1)$$

$$= \sum_{i=1}^{L} \{sw_I(i) \times r_I(i) + sw_Q(i) \times r_Q(i)\}$$

where "$r(i)^*$" denotes a conjugate complex number with respect to the complex number "$r(i)$"; "$sw(i)$" denotes a sample of a pair of the received in-phase signal and the received quadrature signal; "$r(i)$" denotes a 1-sample corresponding segment of a pair of the reference in-phase signal and the reference quadrature signal;

"$sw_I(i)$" denotes a sample of the received in-phase signal; "$sw_Q(i)$" denotes a sample of the received quadrature signal; "$r_I(i)$" denotes a 1-sample corresponding segment of the reference in-phase signal; and "$r_Q(i)$" denotes a 1-sample corresponding segment of the reference quadrature signal. The correlator 10 calculates the value "$comb_Q$" of quadrature correlation between a pair of the received in-phase signal and the received quadrature signal and a pair of the reference in-phase signal and the reference quadrature signal according to an equation as follows.

$$comb_Q = Im\left[\sum_{i=1}^{L} sw(i) \times r(i)^*\right] \quad (2)$$

$$= \sum_{i=1}^{L} \{sw_Q(i) \times r_I(i) - sw_I(i) \times r_Q(i)\}$$

The calculator 16 is informed of the in-phase correlation value "$comb_I$" and the quadrature correlation value "$comb_Q$" by the correlator 10. For every sample interval, the calculator 16 computes the power "comb" of the in-phase correlation value "$comb_I$" and the quadrature correlation value "$comb_Q$" by referring to the following equation.

$$comb = comb_I^2 + comb_Q^2 \quad (3)$$

The calculator 16 outputs a data piece representing the computed correlation power "comb".

An error suppression circuit 18 follows the correlation circuit 6. The error suppression circuit 18 includes a memory 19, an address controller 20, and a selector 23. The input side of the memory 19 is connected to the output side of the calculator 16 in the correlation circuit 6. The output side of the memory 19 is connected to the input side of the selector 23. The address controller 20 is connected to the memory 19. The output side of the selector 23 leads to a circuit (not shown) for producing a symbol clock signal (a symbol timing signal).

The memory 19, the address controller 20, and the selector 23 in the error suppression circuit 18 receive the basic clock pulse signal. The memory 19, the address controller 20, and the selector 23 operate in response to the basic clock pulse signal so that timings of operation thereof are controlled by the basic clock pulse signal.

The output data from the calculator 16 in the correlation circuit 6 is stored into the memory 19 sample by sample. The memory 19 has a capacity corresponding to a given number "M" of symbols, for example, 4 symbols. Accordingly, "L●M" successive output data pieces from the calculator 16 are stored in the memory 19, where "L" denotes the number of samples in a 1-symbol time interval (a symbol interval). The address controller 20 outputs an address signal to the memory 19 to implement address control of the memory 19. The address control of the memory 19 is designed so that a newest output data piece from the calculator 16 is written over the oldest data piece. Thus, each time a newest output data piece from the calculator 16 is stored into the memory 19, the oldest data piece is erased from the memory 19. Also, the address control of the memory 19 is designed to implement the following process. Immediately after the newest output data piece from the calculator 16 is stored into the memory 19, the given number "M" of data pieces, for example, four data pieces, are read out from the memory 19 and are fed to the selector 23. The data pieces read out from the memory 19 include the newest data piece, a data piece which occurs at a moment preceding the moment of the occurrence of the newest data piece by a 1-symbol time interval, a data piece which occurs at a moment preceding the moment of the occurrence of the newest data piece by a 2-symbol time interval, and a data piece which occurs at a moment preceding the moment of the occurrence of the newest data piece by a 3-symbol time interval. Thus, the data pieces read out from the memory 19 correspond to equal sample time positions within successive 1-symbol time intervals. In this way, for every sample interval (every 1-sample time interval), the given number "M" of data pieces, for example, four data pieces, are read out from the memory 19 and are fed to the selector 23. To implement this reading process, the memory 19, the address controller 20, and the selector 23 may operate in response to a sub-sample clock signal having a predetermined frequency higher than the frequency of the basic clock pulse signal.

For example, the computed correlation powers represented by the four output data pieces from the memory 19 are expressed as follows.

$$x(iL+j), x((i-1)L+j), x((i-2)L+j), x((i-3)L+j) \quad (4)$$

where "(iL+j)", "((i−1)L+j)", "((i−2)L+j)", and "((i−3)L+j)" denote the moments of the occurrence of the related computed correlation powers "x" respectively. In addition, "(iL+j)" denotes the moment corresponding to the newest data piece. Furthermore, "i" denotes an order number for a symbol (also referred to as a frame), and "j" denotes an order number for a sample within a symbol interval.

The selector 23 receives the output data pieces from the memory 19. For every sample interval (every 1-sample time interval), the selector 23 chooses one from among the received data pieces, and outputs the chosen data piece. The chosen data piece has a given order number "N" regarding an order in which the received data pieces are arranged according to magnitude of computed correlation power represented thereby. For example, the selector 23 compares the computed correlation powers represented by the received data pieces. Then, the selector 23 chooses one from among the received data pieces which represents the second greatest computed correlation power. Alternatively, the selector 23 may choose one from among the received data pieces which represents the third or fourth greatest computed correlation power.

Generally, a synchronization-acquisition given-pattern signal added in a transmitted radio signal represents a predetermined number "K" of successive given symbols, for example, four successive given symbols. It is usual that during the reception of such a given pattern signal, the computed correlation power periodically peaks above a certain value at the predetermined number "K" of moments (for example, four moments) spaced by 1-symbol time intervals.

Figure 2:
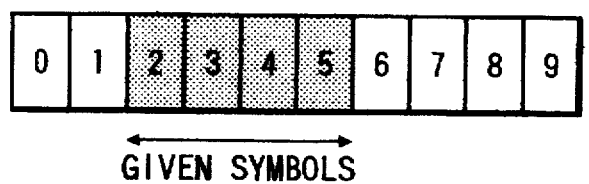
FIG. 2 is a diagram of an example of the format of a transmitted radio signal.

FIG. 2 shows an example of the format of a transmitted radio signal. With reference to FIG. 2, the transmitted radio signal represents a sequence of ten symbols including four successive given symbols. The ten symbols are sequentially numbered as "0", "1", "2", "3", "4", "5", "6", "7", "8", and "9". Each of the symbols "2", "3", "4", and "5" is equal to the given symbol.

Under some conditions, a radio signal from a transmitter is propagated to a receiver via a plurality of paths having different lengths respectively. A shorter path causes a preceding wave component of the radio signal while a longer path causes a delayed wave component thereof. Generally, the shorter path agrees with a direct path, and the preceding wave component of the radio signal is a direct wave component thereof. The preceding wave component (the direct wave component) of the radio signal reaches the receiver before the delayed wave component thereof reaches the receiver. Usually, during the propagation along the longer path, the radio signal is reflected by a building, a mountain, or the like. The computed correlation power tends to be adversely affected by such a delayed wave component.

In the case where the present symbol represented by a radio signal from a transmitter to a receiver closely resembles the given symbol, the related computed correlation power tends to peak to a great value.

Figure 3:
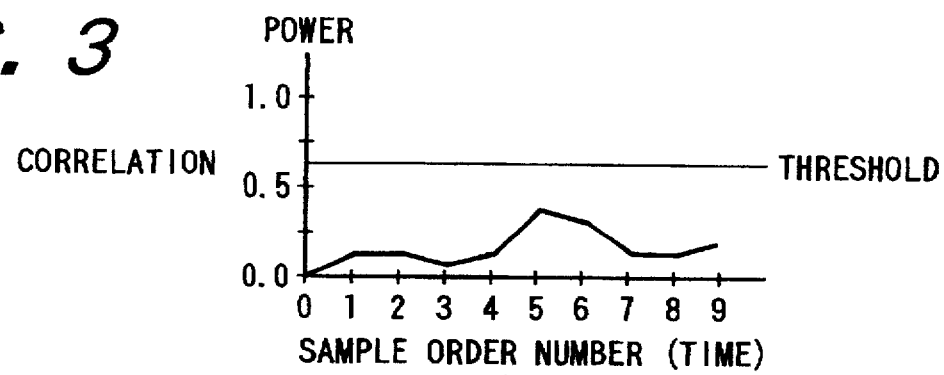
FIG. 3 is a time-domain diagram of a first example of a correlation power periodically calculated in the synchronization device of FIG. 1.
Figure 4:
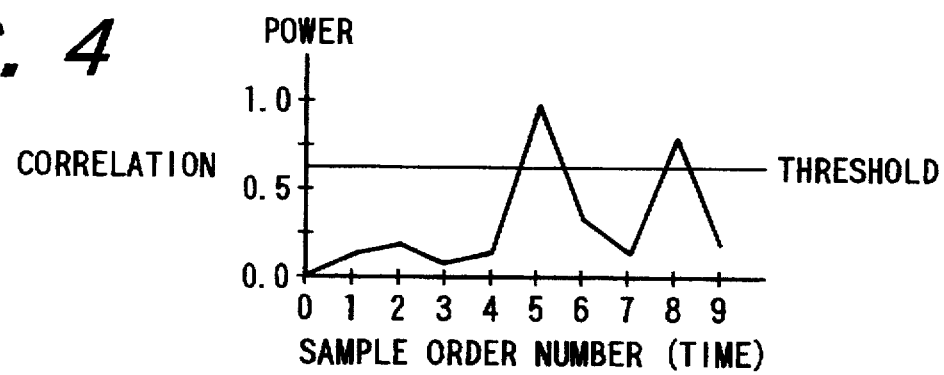
FIG. 4 is a time-domain diagram of a second example of the correlation power periodically calculated in the synchronization device of FIG. 1.
Figure 5:
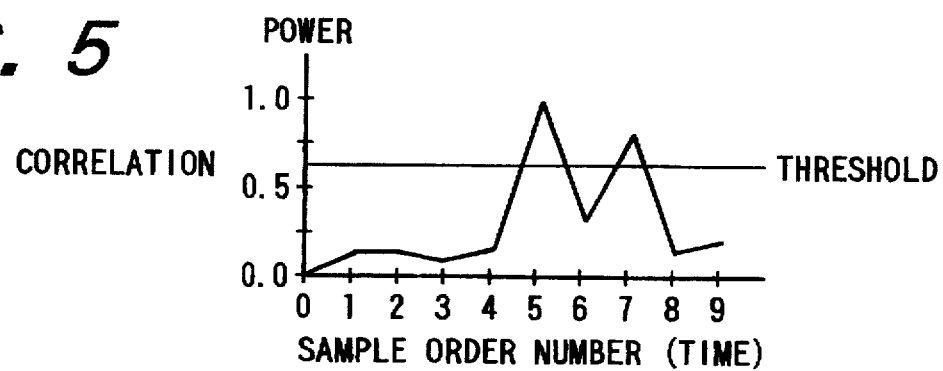
FIG. 5 is a time-domain diagram of a third example of the correlation power periodically calculated in the synchronization device of FIG. 1.
Figure 6:
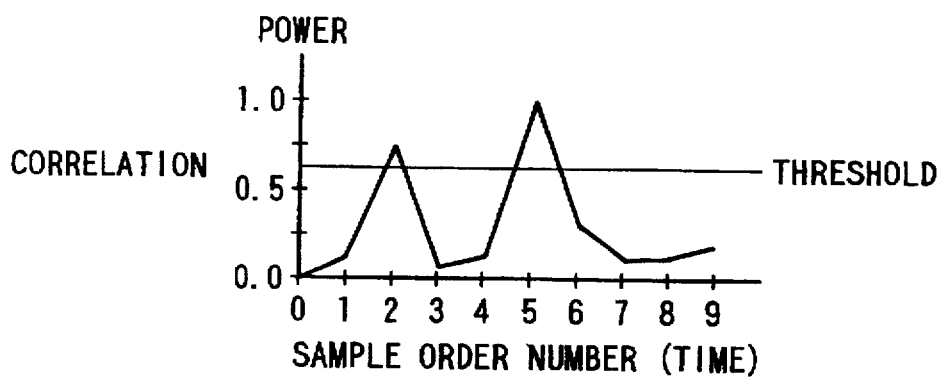
FIG. 6 is a time-domain diagram of a fourth example of the correlation power periodically calculated in the synchronization device of FIG. 1.

FIG. 3 shows an example of a time-domain variation in the computed correlation power which occurs in response to the reception of a given pattern signal during a present 1-frame interval (a present 1-symbol interval) "i". FIG. 4 shows an example of a time-domain variation in the computed correlation power which occurs in response to the reception of the given pattern signal during an immediately-preceding 1-frame interval (an immediately-preceding 1-symbol interval) "i−1". FIG. 5 shows an example of a time-domain variation in the computed correlation power which occurs in response to the reception of the given pattern signal during a second immediately-preceding 1-frame interval (a second immediately-preceding 1-symbol interval) "i−2". FIG. 6 shows an example of a time-domain variation in the computed correlation power which occurs in response to the reception of the given pattern signal during a third immediately-preceding 1-frame interval (a third immediately-preceding I-symbol interval) "i−3".

In each of FIGS. 3, 4, 5, and 6, the computed correlation power is to peak at a moment corresponding to a sample order number "5" within a 1-symbol time interval. With reference to FIG. 3, a delayed wave component causes the computed correlation power available at the moment of the sample order number "5" to peak to only a small value. On the other hand, in each of FIGS. 4, 5, and 6, the computed correlation power available at the moment of the sample order number "5" peaks to great values. In FIG. 4, a symbol represented by a transmitted radio signal which closely resembles the given symbol causes the computed correlation power to peak to a great value at a moment corresponding to a sample order number "8". In FIG. 5, a symbol represented by a transmitted radio signal which closely resembles the given symbol causes the computed correlation power to peak to a great value at a moment corresponding to a sample order number "7". In FIG. 6, a symbol represented by a transmitted radio signal which closely resembles the given symbol causes the computed correlation power to peak to a great value at a moment corresponding to a sample order number "2".

As previously described, the selector 23 receives the four data pieces from the memory 19 which correspond to equal sample time positions within successive four 1-symbol time intervals. The selector 23 chooses one from among the received data pieces which represents the second greatest computed correlation power. The computed correlation power available at the moment of the sample order number "8" in FIG. 4 is not the second greatest among the computed correlation powers available at the moments of the sample order number "8" in FIGS. 3, 4, 5, and 6. Accordingly, the selector 23 does not choose the peak of the computed correlation power at the moment of the sample order number "8" in FIG. 4. The computed correlation power available at the moment of the sample order number "7" in FIG. 5 is not the second greatest among the computed correlation powers available at the moments of the sample order number "7" in FIGS. 3, 4, 5, and 6. Accordingly, the selector 23 does not choose the peak of the computed correlation power at the moment of the sample order number "7" in FIG. 5. The computed correlation power available at the moment of the sample order number "2" in FIG. 6 is not the second greatest among the computed correlation powers available at the moments of the sample order number "2" in FIGS. 3, 4, 5, and 6. Accordingly, the selector 23 does not choose the peak of the computed correlation power at the moment of the sample order number "2" in FIG. 6. On the other hand, if the computed correlation power available at sample order number "5" in FIG. 4 is the second greatest among the computed correlation powers available at sample order number "5" in FIGS. 3, 4, 5, and 6 as shown in these figures, the selector 23 therefore chooses the peak of the computed correlation power at sample order number "5" in FIG. 4. If the computed correlation power available at sample order number "5" in FIG. 5 was the second greatest among the computed correlation powers available at sample order number "5" in FIGS. 3, 4, 5, and 6, the selector 23 would choose the peak of the computed correlation power at sample order number "5" in FIG. 5. If the computed correlation power available at sample order number "5" in FIG. 6 was the second greatest among the computed correlation powers available at sample order number "5" in FIGS. 3, 4, 5, and 6, the selector 23 would choose the peak of the computed correlation power at sample order number "5" in FIG. 6. In this way, the selector 23 accepts a desired peak of the computed correlation power while rejecting false peaks of the computed correlation power.

A decision circuit may follow the selector 23 in the error suppression circuit 18. For every sample interval, the decision circuit receives the output data piece from the selector 23 which represents the computed correlation power (the second greatest computed correlation power). The decision circuit includes a comparator. For every sample interval, the comparator in the decision circuit determines whether or not the computed correlation power is greater than a predetermined threshold value. When the computed correlation power is equal to or smaller than the threshold value, the decision circuit outputs a signal of "1" as an indication of disagreement between a symbol represented by a pair of the received in-phase signal and the received quadrature signal and the given symbol represented by a pair of the reference in-phase signal and the reference quadrature signal. On the other hand, when the computed correlation power is greater than the threshold value, the decision circuit outputs a signal of "0" as an indication of agreement between a symbol represented by a pair of the received in-phase signal and the received quadrature signal and the given symbol represented by a pair of the reference in-phase signal and the reference quadrature signal.

The output signal of the decision circuit may be fed to a signal generator (not shown) for producing a symbol clock signal (a symbol timing signal). The signal generator controls the phase of the produced symbol clock signal in response to the output signal of the decision circuit to synchronize the symbol clock signal with the received signal.

Second Embodiment

Figure 7:
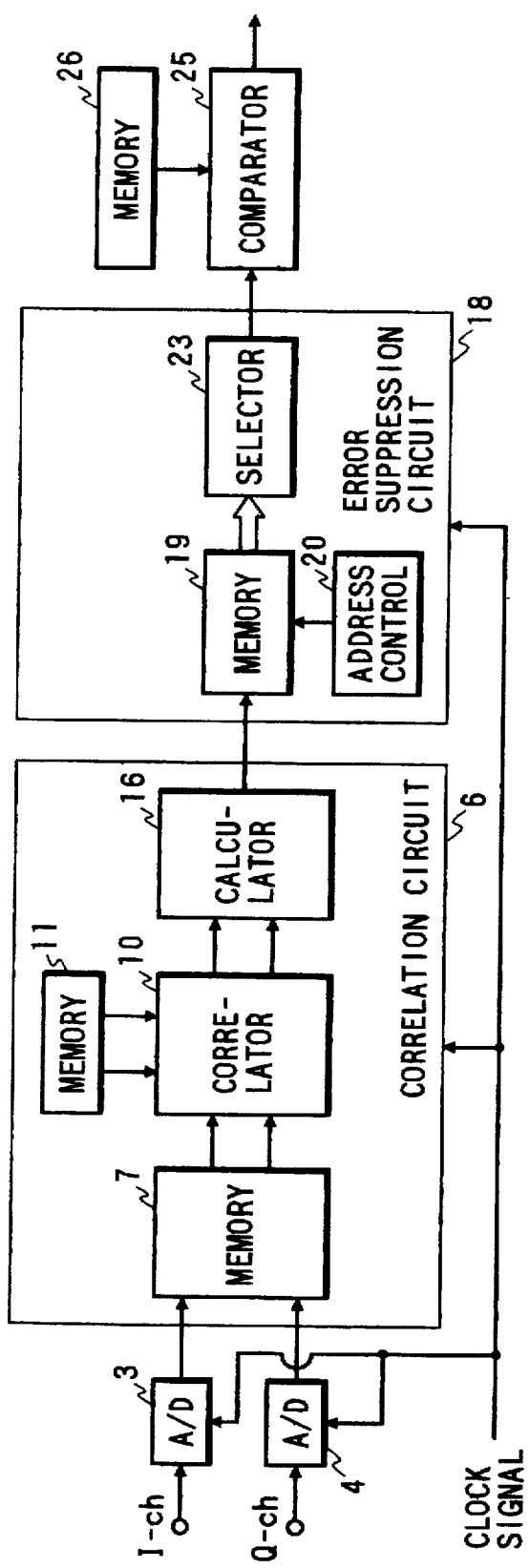
FIG. 7 is a block diagram of a synchronization device according to a second embodiment of this invention.

FIG. 7 shows a second embodiment of this invention which is similar to the embodiment of FIG. 1 except for an additional arrangement explained hereinafter. The embodiment of FIG. 7 includes a comparator 25 and a memory 26.

The comparator 25 follows a selector 23 in an error suppression circuit 18. For every sample interval, the comparator receives the output data piece from the selector 23 which represents a computed correlation power (a second greatest computed correlation power). The memory 26 stores a signal representing a predetermined threshold value. The memory 26 is connected to the comparator 25. The memory 26 informs the comparator 25 of the threshold value. For every sample interval, the comparator 25 determines whether or not the computed correlation power is greater than the threshold value. When the computed correlation power is equal to or smaller than the threshold value, the comparator 25 outputs a signal of "1" as an indication of disagreement between a symbol represented by a pair of the received in-phase signal and the received quadrature signal and the given symbol represented by a pair of the reference in-phase signal and the reference quadrature signal. On the other hand, when the computed correlation power is greater than the threshold value, the comparator 25 outputs a signal of "0" as an indication of agreement between a symbol represented by a pair of the received in-phase signal and the received quadrature signal and the given symbol represented by a pair of the reference in-phase signal and the reference quadrature signal.

The output signal of the comparator 25 may be fed to a signal generator (not shown) for producing a symbol clock signal (a symbol timing signal). The signal generator controls the phase of the produced symbol clock signal in response to the output signal of the decision circuit to synchronize the symbol clock signal with the received signal.

Third Embodiment

Figure 8:
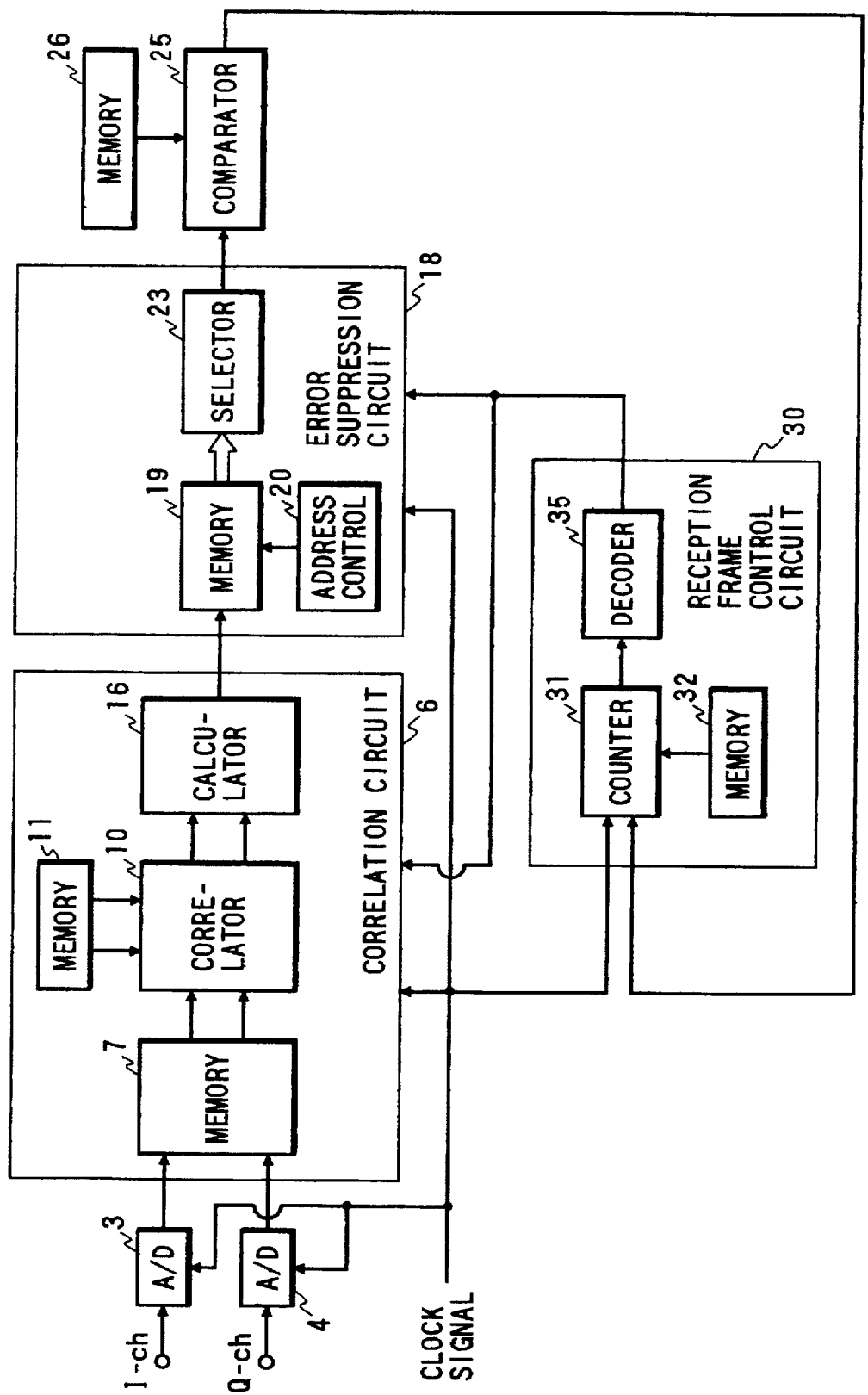
FIG. 8 is a block diagram of a synchronization device according to a third embodiment of this invention.

FIG. 8 shows a third embodiment of this invention which is similar to the embodiment of FIG. 7 except for an additional arrangement explained hereinafter. The embodiment of FIG. 8 includes a reception frame control circuit (a reception window control circuit) 30.

The reception frame control circuit 30 has a counter 31, a memory 32, and a decoder 35. The counter 31 receives a sample clock signal (a basic clock pulse signal), and counts every pulse in the sample clock signal. The counter 31 also receives the output signal of a comparator 25. The memory 32 stores a signal representing a given time point within a 1-symbol time interval. The given time point agrees with a moment at which a computed correlation power is to peak. The given time point corresponds to, for example, a sample order number "5" (see FIGS. 3, 4, 5, and 6). The memory 32 is connected to the counter 31. The memory 32 informs the counter 31 of the given time point within a 1-symbol time interval. The decoder 35 follows the counter 31.

Figure 9:
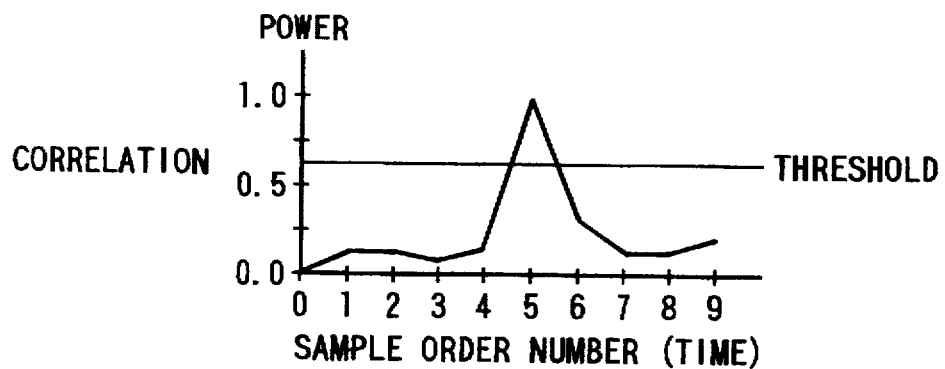
FIG. 9 is a time-domain diagram of an example of a correlation power periodically calculated in the synchronization device of FIG. 8.

FIG. 9 shows an example of a time-domain variation in a computed correlation power which is represented by the output signal of a selector 23 in an error suppression circuit 18. The time-domain variation in FIG. 9 occurs in response to the reception of a given pattern signal during a 1-frame interval (a 1-symbol interval).

With reference to FIG. 9, at the moment of the sample order number "5", the computed correlation power exceeds a predetermined threshold value so that the logic state of the output signal of the comparator 25 changes. This change in the output signal of the comparator 25 enables the counter 31 to be loaded with the signal of the given time point within a 1-symbol time interval. Thereby, the sample pulse counted number provided by the counter 31 is set into correspondence with the given time point within a 1-symbol time interval. Thus, calibration of a measured time point within a 1-symbol time interval is implemented. Then, the sample pulse counted number represented by the output signal of the counter 31 changes from the number of the given time point in response to every pulse in the sample clock signal. The decoder 35 receives the output signal of the counter 31, and decodes the output signal of the counter 31 into a suitable time-representing signal. The decoder 35 outputs the time-representing signal to a correlation circuit 6 and the error suppression circuit 18.

For example, the change in the sample pulse counted number has a cycle corresponding to the number of 1-sample time intervals composing a 1-symbol time interval (for example, ten 1-sample time intervals). In this case, the output signal of the counter 31 or the output signal of the decoder 35 represents a time point within a 1-symbol time interval which sequentially and cyclically changes among sample order numbers "0", "1", "2", "3", "4", "5", "6", "7", "8", and "9" (see FIGS. 3, 4, 5, 6, and 9).

Fourth Embodiment

Figure 10:
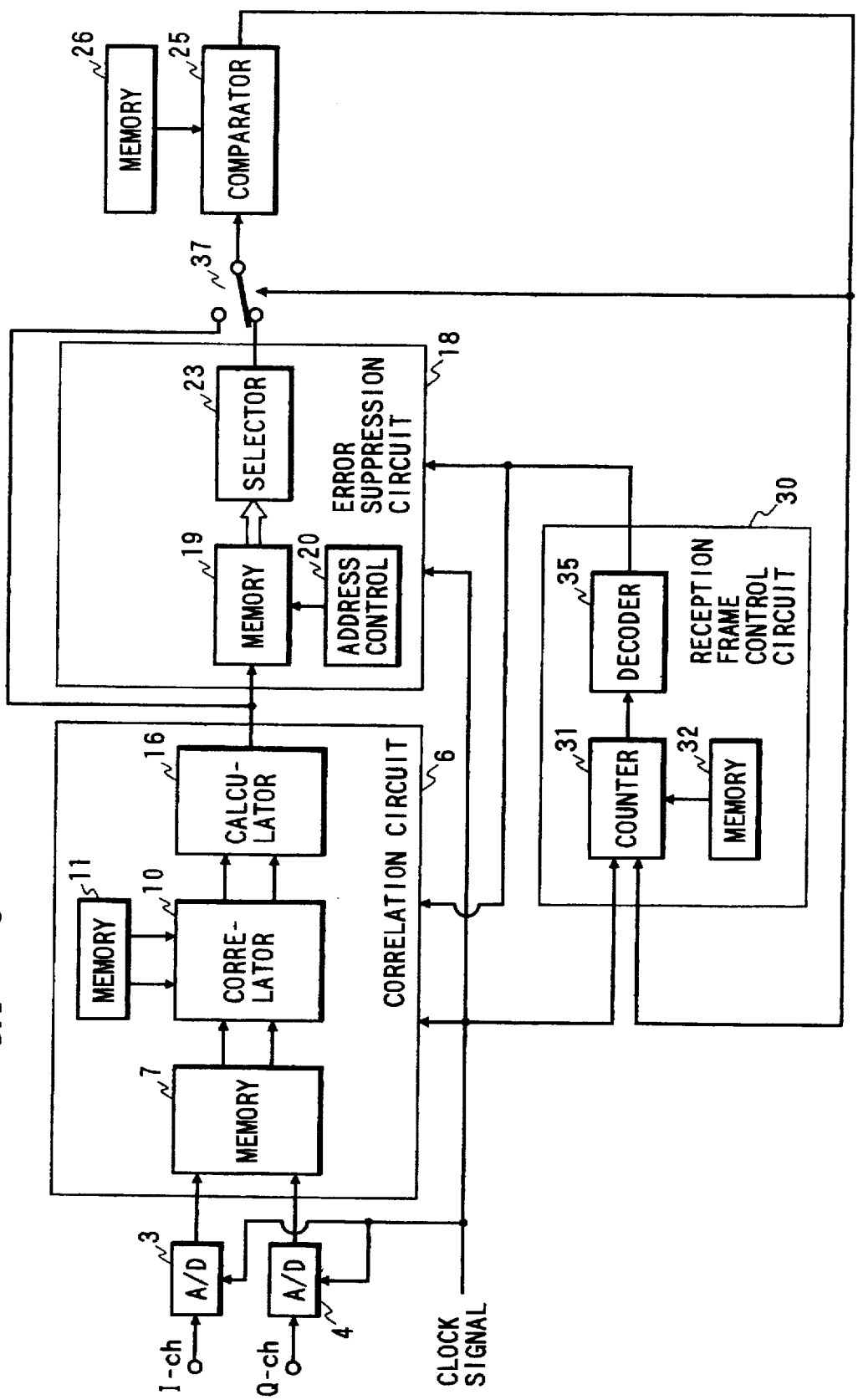
FIG. 10 is a block diagram of a synchronization device according to a fourth embodiment of this invention.

FIG. 10 shows a fourth embodiment of this invention which is similar to the embodiment of FIG. 8 except for an additional arrangement explained hereinafter. The embodiment of FIG. 10 includes a switch 37. The switch 37 selects one out of the output signal of a calculator 16 in a correlation circuit 6 and the output signal of a selector 23 in an error suppression circuit 18, and transmits the selected signal to a comparator 25. The switch 37 responds to the output signal of the comparator 25.

Normally, the switch 37 selects the output signal of the selector 23 and transmits the same to the comparator 25. When the computed correlation power represented by the output signal of the selector 23 exceeds a predetermined threshold value, the logic state of the output signal of the comparator 25 changes. This change in the output signal of the comparator 25 enables the switch 37 to select the output signal of the calculator 17 rather than the output signal of the selector 23. Thus, after symbol synchronization has been acquired, the error suppression circuit 18 is inhibited from acting on a symbol synchronization process.

When symbol synchronization is lost or when communication is changed to a new frequency channel, the switch 37 is changed to select the output signal of the selector 23 again. In this case, the error suppression circuit 18 restarts to effectively operate.

What is claimed is:

1. A synchronization device comprising:
   first means for generating a predetermined signal;
   second means for detecting a correlation between a received signal and the predetermined signal generated by the first means for every sample interval; and
   third means for selecting a correlation from among correlations detected by the second means for sample intervals of equal time positions in successive symbol intervals respectively, wherein the correlation selected by the third means has a given order number regarding an order in which the correlations are arranged to magnitude.

2. A synchronization device as recited in claim 1, wherein the third means comprises means for selecting a second greatest correlation from among correlations detected by the second means for sample intervals of equal time positions in a given number of successive symbol intervals.

3. A synchronization device as recited in claim 1, wherein the third means comprises means for selecting a correlation from among correlations except a greatest correlation which are detected by the second means for sample intervals of equal time positions in a given number of successive symbol intervals.

4. A synchronization device as recited in claim 1, wherein a number of the successive symbol intervals is predetermined.

5. A synchronization device comprising:
   first means for generating a predetermined signal;
   second means for detecting a correlation between a received signal and the predetermined signal generated by the first means for every sample interval;
   third means for selecting a correlation from among correlations detected by the second means for sample intervals of equal time positions in successive symbol intervals respectively, wherein the correlations selected by the third means has a given order number regarding an order in which the correlations are arranged according to magnitude;

fourth means for generating a reference signal representing a predetermined threshold value; and fifth means for comparing the correlation selected by the third means with the threshold value represented by the reference signal.

6. A synchronization device comprising:

first means for generating a predetermined signal;

second means for detecting a correlation between a received signal and the predetermined signal generated by the first means for every sample interval;

third means for selecting a correlation from among correlations detected by the second means for sample intervals of equal time positions in successive symbol intervals respectively, wherein the correlation selected by the third means has a given order number regarding an order in which the correlations are arranged according to magnitude;

fourth means for generating a reference signal representing a predetermined threshold value;

fifth means for comparing the correlation selected by the third means with the threshold value represented by the reference signal;

sixth means for generating a time signal representing time which is updated for every sample interval; and seventh means for calibrating the time represented by the time signal in response to a result of the comparing by the fifth means.

7. A synchronization device comprising:

first means for generating a predetermined signal;

second means for detecting a correlation between a received signal and the predetermined signal generated by the first means for every sample interval;

third means for selecting a correlation from among correlations detected by the second means for sample intervals of equal time positions in successive symbol intervals respectively, wherein the correlation selected by the third means has a given order number regarding an order in which the correlations are arranged according to magnitude;

fourth means for generating a reference signal representing a predetermined threshold value;

fifth means for comparing the correlation selected by the third means with the threshold value represented by the reference signal; and sixth means for inhibiting the third means from effectively operating in response to a result of the comparing by the fifth means.

* * * * *

UNITED STATES PATENT AND TRADEMARK OFFICE
CERTIFICATE OF CORRECTION

PATENT NO. : 5,802,121
DATED : September 1, 1998
INVENTOR(S): Katsuhiko Hiramatsu It is certified that error appears in the above-identified patent and that said Letters Patent is hereby corrected as shown below:

At claim 1, line 11, (col. 10, line 44 of the issued patent), after "arranged", insert --according--.

At claim 5, line 9, (col. 11, line 2), replace "correlations" with --correlation--.

Signed and Sealed this

Eighth Day of December, 1998

Attest:

BRUCE LEHMAN

Attesting Officer

Commissioner of Patents and Trademarks